Figure 1:
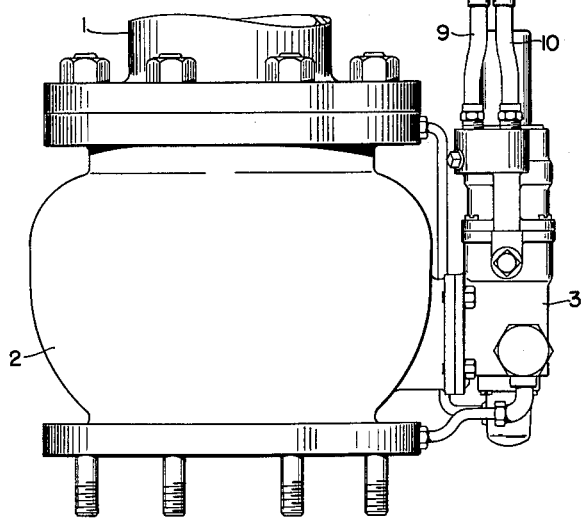

June 4, 1963

R. W. KENNEY 3,092,140

RELEASABLE BALANCED FLUID COUPLING

Filed March 15, 1960

*INVENTOR.*
ROBERT W. KENNEY

BY *Merl E. Seeales*

Attorneys

United States Patent Office 3,092,140
Patented June 4, 1963

3,092,140
RELEASABLE BALANCED FLUID COUPLING
Robert W. Kenney, South Pasadena, Calif., assignor to
A. O. Smith Corporation, Milwaukee, Wis., a corporation of New York
Filed Mar. 15, 1960, Ser. No. 15,215
3 Claims. (Cl. 137—594)

This invention relates to a releasable balanced fluid coupling having a pair of telescoped coupling components with no fluid forces acting to separate the components and is particularly directed to a coupling having the interconnecting channels or passages arranged such that the coupling components can be telescopically assembled with any angular orientation.

Coupling members employed to connect fluid transporting conduits or lines must, in certain applications, allow an exceptionally rapid disconnect by a mere pulling on either side of the coupling. Thus, in aircraft fueling systems, the main fuel supply lines normally include a line valve which is variably opened by a pressure reducing control valve. The control valve is hydraulically controlled by a main control line and also by a suitable feedback from the discharge side of the line valve to maintain a predetermined discharge pressure.

The coupling of the main control line and the feedback line to the control valve is normally within the working area adjacent the fueling station. Consequently, the coupling and control line are subject to accidental stresses tending to break the lines. Further, in case of an emergency, the control lines are preferably coupled to allow a very quick break to immediately discontinue flow of fuel through the main line. However, lines carrying fuel such as the feedback line must be closed incident disconnection of the coupling to prevent the escape of appreciable amounts of fuel into the surrounding fuel area.

The present invention is directed to a quickly releasable balanced fluid coupling which is particularly adapted for interconnecting the control lines for an aircraft fueling system and the like. The coupling members are telescoped to establish a simple sliding connection with interconnecting passages allowing interconnection without regard to angular orienting of the two coupling members. Valve means are provided in the coupling member connected to the fuel line to automatically open and close the corresponding connective passage incident assembly and disassembly of the coupling.

In accordance with the present invention, the coupling includes a socket member having a central bore adapted to telescopically receive a cylindrical plug member. A vent hole in the base of the central bore prevents a pressure rise within the bore tending to push the plug member outwardly. The socket member and the plug member each have L-shaped passages terminating in radially aligned portions to establish corresponding fluid paths through the coupling. The radial portions in each of the socket member and plug member for the several different fluid paths terminate in axially spaced relation to prevent misalignment of passages in the respective members.

Generally, the fluid path is such that no hydraulic forces are established within the coupling tending to separate the socket and plug members. Consequently, by forming a relatively tight sliding fit between the bore of the socket and the accommodated plug, the coupling is self-locking and no special latch is necessary.

In accordance with the present invention, one of the cooperating surfaces of the coupling members is counter bored to create an annular space housing a series of stacked O-ring seals and spacer members. The spacer members are aligned with the radial portions of the fuel passages, and have channel-shaped cross-sections to define an annular passage adjacent the corresponding radial portions of the L-shaped passages with the coupling assembled. An opening in the web or axial portion of each spacer communicates with the radial portion of the passage of the corresponding coupling member. The annular passage formed by a spacer member always presents a connecting passage between the L-shaped passages in the coupling members.

An annular passage is also formed in the surface of the opposite member immediately adjacent the terminal end of the radial portion of the passage and all sharp edges are broken. The socket member and plug members may then be fitted together without damage to the O-ring seals. The fuel line passage within the coupling member connected to the source of fuel or the like includes a valve unit which is biased to close the corresponding passage. A valve arm or actuator projects axially through the corresponding coupling member and projects from a surface which in the assembled position abuts a surface of the other coupling member. When the plug and socket members are assembled, the actuator is positively moved inwardly to open the valve unit. Consequently, the fuel passage is only open when the coupling members are assembled.

The present invention provides an easily constructed balanced coupling permitting rapid and automatic breaking of the coupling and sealing off a fuel line or the like.

The drawing furnished herewith illustrates the best mode presently contemplated for carrying out the invention.

Figure 2:
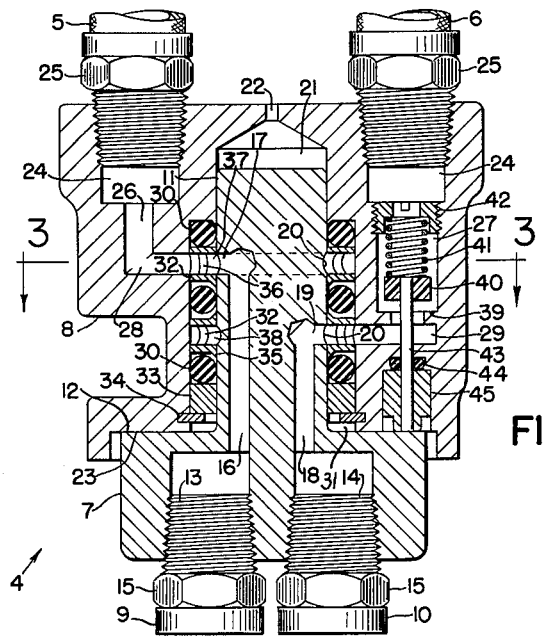
Figure 3:
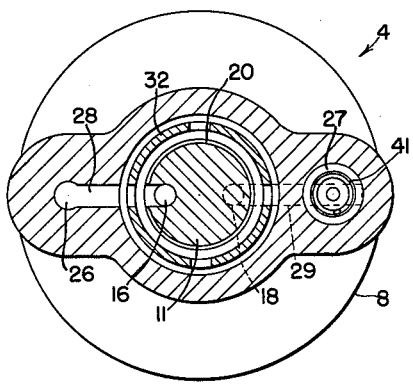

In the drawing:
FIGURE 1 is a side elevational view of a control valve and a balanced fluid coupling constructed in accordance with the present invention;
FIG. 2 is an enlarged vertical section through the coupling shown in FIG. 1;
FIG. 3 is a sectional view taken on line 3—3 of FIG. 2; and
FIG. 4 is an exploded view of the two parts of the coupling illustrating the valve action.

Referring to the drawing and particularly to FIG. 1, a main fuel line 1 is illustrated having an in-line valve 2 adapted to vary the fuel flow in the main fuel line and thereby establish a predetermined discharge pressure. A pressure reducing valve 3 is connected to valve 2 to control the opening of the in-line valve 2 and is biased to hold valve 2 closed. The pressure reducing valve 3 is of a dual action variety adapted to have a main fluid input control and a secondary modulating control. A coupling 4 individually connects the valve 3 to an on-off control air line 5 which is manually controlled in any suitable manner, not shown, and a fuel line 6 which is coupled to the output side of the in-line valve 2 to establish a feedback static pressure signal. If both lines 5 and 6 is disconnected from valve 3, the in-line valve 2 quickly closes and stops fuel flow in line 1.

The valves 2 and 3, the air line 5 and fuel line 6 are of any standard construction. A particularly satisfactory system of valves and control lines is shown in applicant's copending application No. 15,217, entitled "Fluid Flow Control" which was filed on even date herewith and is assigned to a common assignee. No further description of these elements are given except to the extent necessary to clearly and fully explain the present invention.

Figure 4:
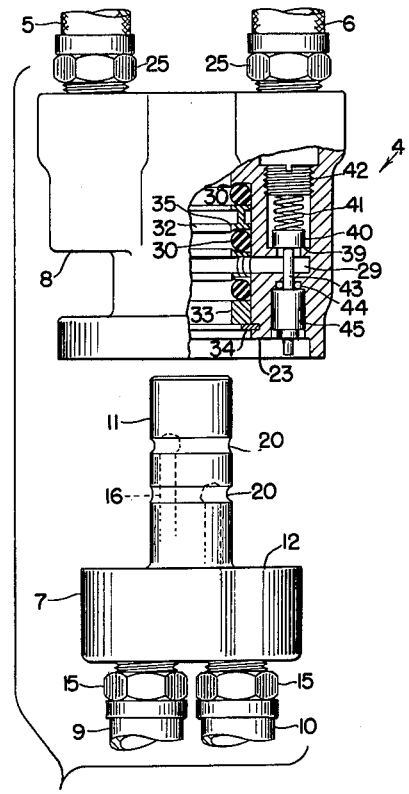

Referring particularly to FIGS. 2–4 in the drawing, a preferred construction of the coupling 4 is illustrated. The coupling 4 generally includes a plug 7 which slidably telescopes into a socket 8. A coupling air line 9 is secured to the plug 7 and to the valve 3 and a coupling fuel line 10 is also secured to the plug 7 and the valve 3. The plug 7 and socket 8 include connected passages more fully described hereinafter, which are adapted to connect the air line 9 and the fuel line 10 to the control air line 5 and the modulating fuel line 6 to control the position of the pressure reducing valve 3 and thus the in-line valve 2.

The plug 7 is generally a cylindrical member having a cylindrical stem 11 which projects axially from an enlarged body portion defining a seating shoulder 12. A pair of tapped axial openings 13 and 14 are diametrically spaced within the body portion of the plug 7. Similar threaded fittings 15 are secured within the tapped openings 13 and 14 and connected respectively to the air line 9 and the fuel line 10. An L-shaped air passage 16 extends axially off-center upwardly through the plug 7 and terminates in a radial port 17 in the outer end of stem 11. The radial port 17 extends to the outer surface of the stem 11 to establish a complete path through plug 7. Similarly, an L-shaped fuel passage 18 extends axially of plug 7 in diametrically spaced relation to the air passage and terminates in a radial port 19 which extends in an opposite direction to radial port 17 and terminates adjacent the outer surface of the stem 11. The radial ports 17 and 19 are also axially spaced within stem 11 and each terminates in an annular groove 20 in the plug stem 11.

The socket 8 is generally a cylindrical member having a central tubular bore 21 extending substantially through the complete socket. The diameter of bore 21 generally corresponds to the outer diameter of the stem 11 to establish a close slip fit therebetween. An opening 22 in the outer end wall of the socket 8 vents the bore 21 to atmosphere and prevents any pressure increase within the cavity between the end of stem 11 and the bore as a result of the insertion of the stem 11 into the bore or because of leakage of air or fuel from the corresponding passages.

The lower end of the socket 8 is machined to define an annular seating wall 23 encircling stem 11. Shoulder 12 seats upon wall 23 to correctly locate the stem 11 extended into the bore 21.

Suitable diametrically spaced tapped openings 24 are provided in the outer end of the socket 8 and correspondingly secured to lines 5 and 6 by suitable threaded fittings 25. L-shaped passages 26 and 27 extend axially from the openings 24 and terminate in radial ports 28 and 29 which are axially spaced from each other in accordance with the axial spacing of the radial ports 17 and 19 in the stem 11. When the stem 11 of plug 7 is completely assembled with socket 8 as determined by engagement of seating wall 23 of socket 8 and shoulder 12 of plug 7, ports 17 and 19 are in common planes with ports 28 and 29 respectively.

The sliding surfaces of plug 7 and socket 8 as defined by stem 11 and bore 21 are sealed by a plurality of O-rings 30 to substantially eliminate escape of air or fuel.

As most clearly shown in FIG. 2, the bore 21 of socket 8 is provided with a counter bore 31 in the portion partially coincident with the stem 11. The O-rings 30 are axially spaced within the counter bore 31 on opposite sides of the radial ports 28 and 29 in the socket 8. A pair of annular spacers 32 having an I-shaped cross-section are disposed in stacked relation between the three O-rings 30 and in alignment with ports 28 and 29. A ring spacer 33 is disposed adjacent the lower O-ring and held in position by a snap ring 34 which mates with a suitable angular recess within the outer end of the counter bore 31. The snap ring 34 clamps the O-rings and spacer within the counterbore 31 with axial compression of the O-ring. The end wall of the counter bore 31 and the radially inner end edges of the spacers 32-34 are provided with flared portions 35 which extend axially in front of the O-rings 30 to hold the O-ring generally within the counter bore 31 except for very slight protrusion into sealing engagement with the surface of the stem 11 in the assembled position. The grooves 20 adjacent the terminal ends of the radial ports 17 and 19 prevent the normal sharp corners of the ports from damaging the O-rings 30 to insure a long life unit.

Each of the I-shaped spacers 32 is positioned with the flanges extending radially in a plane perpendicular to the axis of counter bore 31 and generally with the inner surface of the flanges aligned with the adjacent surfaces of the radial ports 28 and 29. The web of each I-shaped spacer 32 extends axially of the plug 7 and the socket 8. Four equicircumferentially spaced openings 36 are formed in the web of the spacers 32 with one of the openings shown in alignment with the radial ports 28 and 29 of the L-shaped passages in socket 8. The I-shaped spacers 32 form annular passages 37 and 38 with the cooperating outer surface of the stem 11 to establish communication between the aligned radial ports 17 and 28 and the ports 19 and 29 for all angular positioning of the plug stem 11 and the socket bore 21. The openings 36 allow the flow through the spacers. Therefore, the plug 7 and socket 8 can be assembled without any specific angular orientation and the L-shaped passages 16 and 18 of the plug 7 automatically communicate with the corresponding L-shaped passages 26 and 27 of the socket 8 coincident with engagement of shoulder 12 and the seating wall 23.

In the disassembled condition of the coupling 4, the fuel passage 27 is sealed to prevent fuel spillage from the line 6 as shown in FIG. 4.

Referring particularly to FIGS. 2–4, a valve seat 39 is provided partially closing the axial portion of the fuel passage 27 in socket 8. A valve 40 is disposed within the axial portion of the passage 27 overlying the seat 39 and is biased into engagement with seat 39 by a spring 41 to seal the passage 27. A spring stop 42 is threadedly secured within the axially outer portion of passage 27 immediately adjacent the tapped opening 24 to hold spring 41 within passage 27 and thereby continuously bias the valve 40 into engagement with the valve seat 39. A valve actuator or stem 43 is secured to the valve 40 and projects axially through the valve opening defined by the valve seat 39 and outwardly through a suitable axial opening formed in the aligned portion of the socket 8 and the seating wall 23. As the stem 11 is inserted into the socket 8 and more particularly as the radial ports in plug 7 and socket 8 move into alignment, the shoulder 12 moves into engagement with the outer end of the stem 43. During the final movement of the stem 11 into the bore 21, the shoulder 12 forces the stem 43 and the attached valve 40 inwardly to move the valve 40 from the valve seat 39, as shown in FIG. 2 and allows fuel to flow freely through coupling 4 from fuel line 6 to the coupling fuel line 10.

An O-ring seal 44 encircles the stem 43 within the socket 8 and is held in sealing relation by a bearing and seal retainer 45 to prevent fuel leakage through the opening for the valve stem. The bearing and seal retainer 45 is press fitted or otherwise fixed to the socket 8.

When the plug 7 and socket 8 are disassembled, the valve 40 is forced into engagement with seat 39 by the spring 41 to close passage 27 and prevent fuel spillage.

The only fuel which might escape is the very small amount contained within the fuel line 10. This amount is normally inconsequential and will not cause any particular danger.

The L-shaped passages in plug 7 and socket 8 maintain these parts in hydraulic balance. At no time is fluid pressure applied to either plug 7 or socket 8 in a manner which tends to establish axial movement therebetween. The small vent opening 22 provides a continuous drain for any slight leakage past the O-rings 30 between plug 7 and socket 8 and thus prevents a pressure rise in the cavity between the end of stem 11 and the base of bore 21. Therefore, the necessity for an auxiliary latch is eliminated.

The holding forces between the stem 11 and the socket 8 can be relatively small and any positive pulling force on the socket 8 or the plug 7 results in rapid and positive disconnection of the parts. The vent opening 22 prevents suction forces tending to hold the plug 7 and the socket 8 in assembled relation. The connection of the feedback fuel line 6 can thereby be quickly broken to close the in-line valve 2 and discontinue fuel flow in line 1.

In the illustrated embodiment of the invention, the L-shaped air passage 24 in socket 8 is open upon disconnection of the socket 8 and the plug 7. Air and the like are non-dangerous and the passage need not be sealed. If fuel or some other potentially harmful medium is employed, the passage 24 could readily be provided with a valve system generally corresponding to that shown sealing the L-shaped fuel passage 27.

Although specifically illustrated in connection with aircraft fueling system or the like, the coupling is obviously applicable to any fluid coupling system where a balanced coupling is desired. If more than two separate paths are necessary, the additional paths are angularly displaced within the stem 11 and terminate in axially spaced radial ports. The socket member is correspondingly constructed with the necessary L-shaped passages.

The present invention thus provides a simple and positive action coupling of the balanced variety. The method of forming the annular passages to establish the desired communication for all angular orientation of the coupling members is particularly simple and adapted to commercial practice.

Various modes of carrying out the invention are contemplated as being within the scope of the following claims particularly pointing out and distinctly claiming the subject matter which is regarded as the invention.

I claim:
1. A balanced releasable coupling, which comprises a coupling plug having a tubular stem projecting axially of a positioning shoulder, a socket having a bore adapted to accommodate said stem and a positioning surface adapted to engage the shoulder to axially position the stem within the bore, said socket having a vent opening communicating with the bore to eliminate pressure between the base of the bore and the end of the stem, said stem and said socket each having at least one L-shaped passage terminating in a radial portion, said radial portions in the stem and the socket being axially aligned incident engagement of the positioning surface and shoulder, at least one of said members having an annular passage including the corresponding radial portion of the L-shaped passage, resilient sealing means disposed between the stem and bore on both sides of the radial portions of the passages and the annular passage to prevent fluid leakage therebetween, a valve closing the L-shaped passage in the socket, and an actuator means affixed to the valve and slidably journaled in the socket and engaging the positioning shoulder to hold the valve open incident assembly of the stem into the bore of the socket.

2. A balanced releasable coupling, which comprises a socket having a bore and a positioning surface adjacent the outer end of the bore, a coupling plug having a tubular stem projecting axially of a positioning shoulder said stem and bore being constructed to establish a close slip fit of the stem into the bore, the shoulder and positioning surface being in abutting relation incident correct axially positioning of the stem within the bore, said socket having a vent opening communicating with the bore to eliminate a pressure between the base of the bore and the end of the stem, said stem and said socket each having an L-shaped passage terminating in a radial port, said ports in said stem and said socket being aligned incident engagement of the positioning shoulder and surface, one of said members having an annular passage axially and radially aligned with the corresponding radial port, the other of said members being counter bored adjacent the radial ports, encircling sealing means disposed within the counter bore on both sides of the radial ports to prevent fluid leakage between the stem and bore, a channel-shaped spacer disposed between the sealing means and in alignment with the radial port and having openings to permit flow through the corresponding port, a valve closing the axial portion of the L-shaped passage in the socket, and a rod-like actuator means connected to the valve and slidably journaled in the socket for axial movement and engaging the positioning shoulder to hold the valve open incident complete insertion of the stem into the bore of the socket.

3. A balanced releasable coupling for interconnecting an air line and a fuel line to control a dual action valve, which comprises a socket having a central bore and a pair of L-shaped passages extending from an end surface opposite the opening to the bore and having a positioning surface adjacent the opening to the bore, said L-shaped passages terminating in inwardly projected radial ports axially spaced within the central bore, a coupling plug having a tubular stem projecting axially of a positioning shoulder and adapted to slip fit with the bore in said socket, a vent opening extending from the bore to the exterior of the socket to eliminate pressure within the bore incident insertion of the stem, a pair of L-shaped passages in said stem having radial ports axially spaced in accordance with the radial ports in said socket and aligned therewith incident engagement of the positioning shoulder and positioning surface, an annular groove in the plug in axial alignment with each port, said socket member being counter bored beyond the radial ports, sealing O-rings disposed within the counter bored portion and axially spaced on both sides of the radial ports, I-shaped ring spacers disposed between the O-rings and having lips retaining the O-rings within the counter bored portion, said spacers having openings communicating with the corresponding L-shaped passages, means to clamp the O-rings and spacers in place, a valve having an axially movable closure member closing the axial portion of one of the L-shaped passages in the socket for connection to the fuel line, and a rod-like actuator means affixed to said valve and slidably journaled in the socket and projecting axially from the positioning surface in alignment with the closure member of the valve, said positioning shoulder engaging the actuator and holding the actuator within the plug to open the valve incident complete assembly of the stem into the bore of the socket.

References Cited in the file of this patent
UNITED STATES PATENTS

| | | |
|---|---|---|
| 1,121,202 | Rembold | Dec. 15, 1914 |
| 2,143,637 | Vollmann | Jan. 10, 1939 |
| 2,590,787 | Nickles | Mar. 25, 1952 |
| 2,612,389 | MacGlashan | Sept. 30, 1952 |
| 2,619,367 | Hanson | Nov. 25, 1952 |
| 2,768,843 | Zeilman | Oct. 30, 1956 |
| 2,856,959 | Kamenetzky | Oct. 21, 1958 |
| 2,898,867 | Saalfrank | Aug. 11, 1959 |
| 2,950,895 | Anderson | Aug. 30, 1960 |